United States Patent [19]

Gause et al.

[11] 4,259,700
[45] Mar. 31, 1981

[54] APPARATUS FOR RECORDING AND REPRODUCING INFORMATION ON MAGNETIC TAPE

[75] Inventors: Dieter Gause, Weiterstadt; Theo Wolf, Rossdorf; Wolfgang Fell, Seeheim, all of Fed. Rep. of Germany

[73] Assignee: Robert Bosch GmbH, Stuttgart, Fed. Rep. of Germany

[21] Appl. No.: 10,620

[22] Filed: Feb. 9, 1979

[30] Foreign Application Priority Data

Feb. 21, 1978 [DE] Fed. Rep. of Germany ....... 2807272

[51] Int. Cl.³ ...................... G11B 15/00; G11B 17/00
[52] U.S. Cl. ........................................ 360/95; 360/93; 360/137
[58] Field of Search ............................. 360/93, 95–96, 360/85, 137

[56] References Cited

U.S. PATENT DOCUMENTS

| | | | |
|---|---|---|---|
| 3,724,858 | 4/1973 | Martin | 360/96.1 |
| 3,870,247 | 3/1975 | Carisey | 360/96.5 X |
| 3,940,793 | 2/1976 | Bleiman | 360/99 |
| 4,050,087 | 9/1977 | Kishi | 360/95 |
| 4,130,848 | 12/1978 | Amano et al. | 360/95 X |

Primary Examiner—John H. Wolff
Attorney, Agent, or Firm—Frishauf, Holtz, Goodman & Woodward

[57] ABSTRACT

A mechanism for receiving and handling magnetic tape for the purpose of information recording and retrieval, especially from magnetic tape stored in two-reel cassettes. The mechanism includes movable tape handling and tape guide elements which engage the tape in a threading process without the application of tangential stresses and place it in a predetermined path. The tape is handled by the drive capstan of the apparatus which, in the threading operation and the tape removal operation, is temporarily engaged by mechanical linkages that are powered by the rotation of an external carrying handle.

11 Claims, 12 Drawing Figures

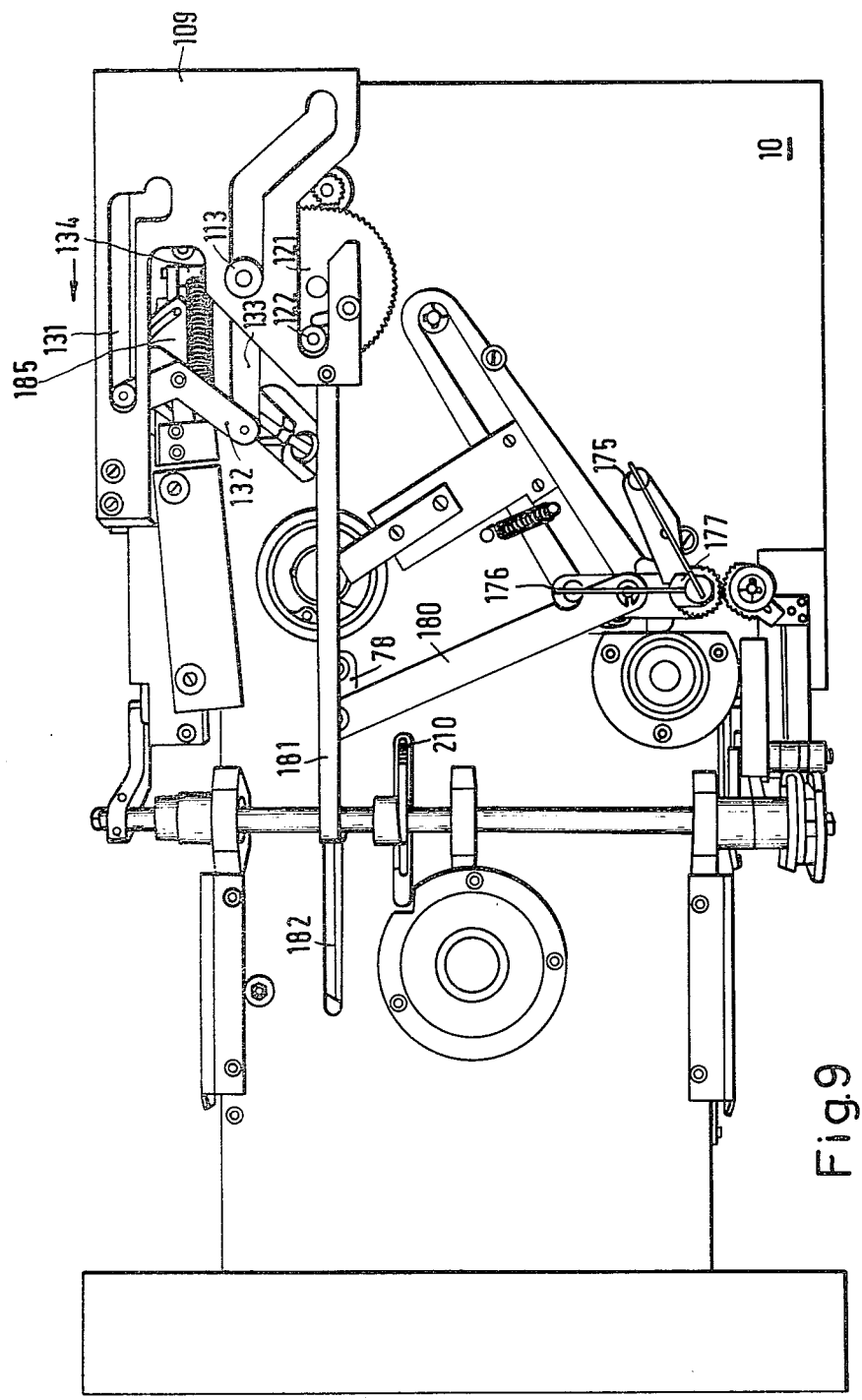

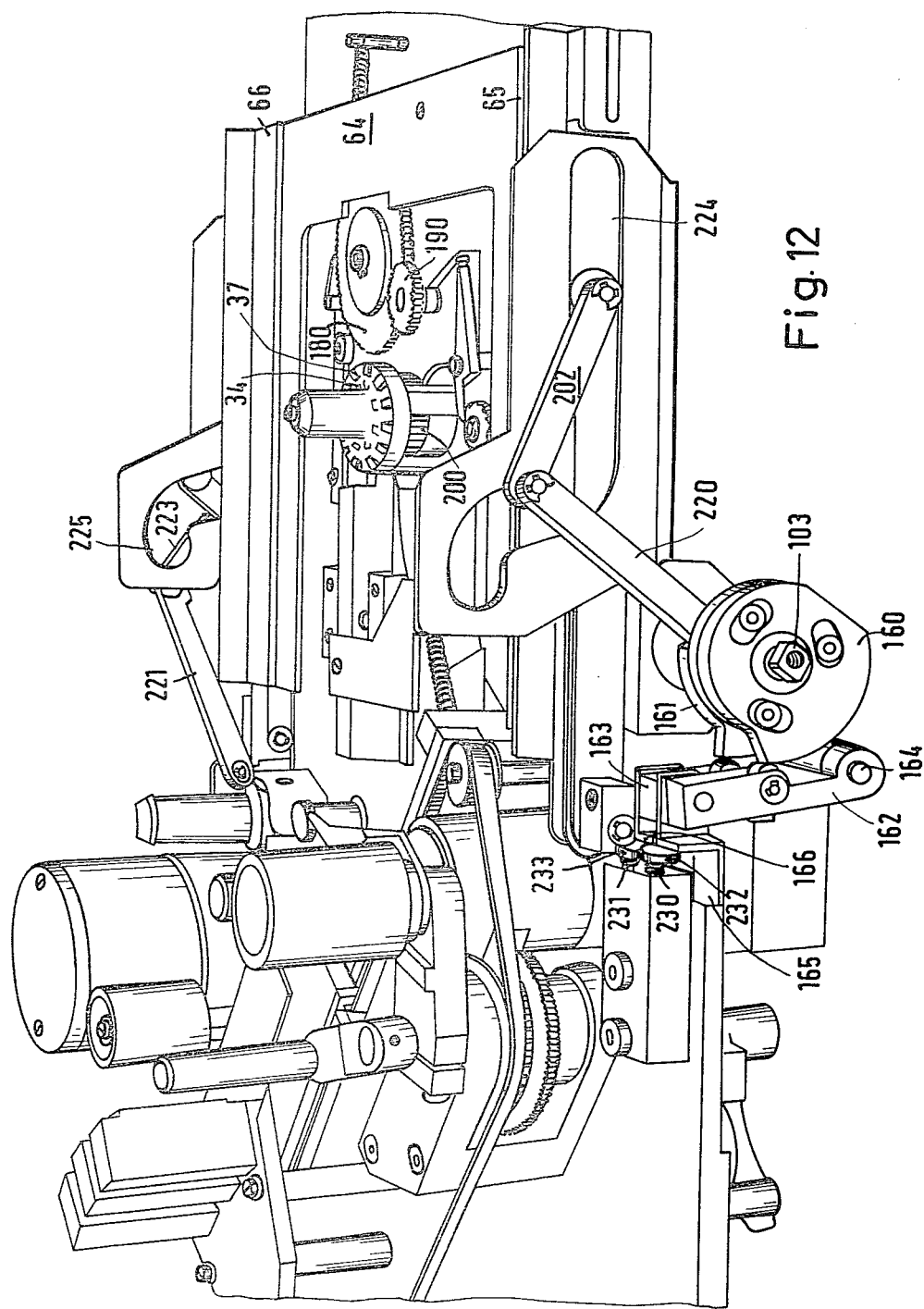

APPARATUS FOR RECORDING AND REPRODUCING INFORMATION ON MAGNETIC TAPE

FIELD OF THE INVENTION

The invention relates to recording and playback apparatus for magnetic tape, in particular video recording tape stored in a cassette. The invention relates especially to the mechanism for threading the tape loop to follow a predetermined path in the apparatus and for removing it therefrom.

BACKGROUND AND PRIOR ART

It has been found useful in practice to record and play back television information on magnetic tape recorders in which the recording tape is looped at an angle around a stationary or rotatable guide drum while it is scanned by magnetic transducers mounted on a support wheel located within the guide drum. Due to the interaction of the relatively low transport speed of the magnetic tape and the relatively high rotational speed of the support wheel, the information is recorded on the magnetic tape as a series of parallel tracks which lie at an angle with respect to the edge of the magnetic tape. This type of recorder makes possible a very dense storage of the information and thus requires relatively small amounts of magnetic tape to store a given quantity of information.

In the evolution of the tape recording and playback apparatus for video tapes, it has been found useful to store the magnetic tape in a cassette which facilitates handling. In one design of a tape cassette, two coaxial reels hold the magnetic tape which passes from one reel to the other during the operation of recording or playback. A portion of the tape path lies within the cassette and is inclined with respect to the plane of the cassette. The overall difference in height which is traversed by the tape substantially corresponds to the height traversed by the tape in its loop around the transducer cylinder. Accordingly, the magnetic tape is removed for example, from the lower reel and passes on a parallel path to the plane of the cassette around a number of guide elements after which it loops the recording or playback mechanism so that its center line describes a part of a helix whose ascent on the cylinder is approximately equal to the width of the tape. Subsequently, the magnetic tape is guided around another set of guide elements and past a set of recording and playback heads which serve to record and play back a longitudinal track on the tape and this part of the path takes place in a plane which is parallel to the initial part of the path within the cassette. Subsequently, the tape is wound up on the upper cassette reel.

It follows from the above that, when the magnetic tape is stored in the cassette, it lies in a path which includes a portion that is inclined with respect to the plane of the reels. The angle of this internal inclination is determined by general requirements of construction of the cassette, for example by the reel diameter, the tape width or the separation between guide elements. On the other hand, when the cassette is placed in operational position within the apparatus and a loop of tape is removed from the cassette, it is desirable that the tape leave and enter the cassette substantially parallel to the plane of the cassette and that the inclined portion of the magnetic tape is substantially totally within the region of the recording and playback mechanism, i.e., in the tape loop around the transducer head.

In order to meet the requirement for long recording times, video recording tape is extemely thin so as to permit the storage of a large amount of information on a reel of a given size. As a consequence, video recording tapes are very sensitive to mishandling. Any longitudinal tension on the tape tends to impart a waviness to the tape edge which may make all the tape on a particular reel useless.

Attempts have been made in the past to develop mechanisms for loading and threading the magnetic tape from the cassette without the intervention of human hands. However, it has been found to be extremely difficult to remove the magnetic tape which is held in the cassette under a certain amount of tension without causing undesirable stresses to be imparted thereto, at least during certain transition stages. A particular difficulty has been the design of tape guiding elements which engage the tape immediately before and after its passage over the transducer and whose position must be fixed to very precise tolerances after the tape has been threaded. A further difficulty arises from the fact that the tape must be placed in a path whose angle of inclination is different from the angle with which it is stored within the cassette.

On the other hand, the inherent advantages available by the dense storage which is made possible by the looping of the transducer head and by the convenient packaging of magnetic tape in cassettes have led to the construction of magnetic recorders of relatively small dimension and weight which permit portable operation on battery power and enable the user to record news items and other transient information. In a portable tape recorder of this type, it is important to permit a relatively long operation on battery power so that any processes which require mechanical motion not directly related to the recording of information should be performed without the use of stored electrical energy.

THE INVENTION

It is thus an object of the present invention to so construct a recording and playback apparatus for magnetic tape as to thread and guide the magnetic tape in the apparatus without the application of any longitudinal stresses, which, preferably the tape is removed from the cassette, threaded in the apparatus and returned to the cassette entirely by mechanical means requiring no electrical power.

Briefly, the tape drive roller, or capstan is caused to engage the tape at the very onset of tape threading and deliberately rotated by the threading operation to feed tape. At the same time, the tape is pressed against the capstan by a pressure roller. Stresses on the tape are prevented by feeding the tape during threading rather than pulling it out of the cassette by the threading mechanism.

It is a further advantageous feature of the invention that all tape deflecting or reversing elements engage the tape on the uncoated side thereof and thus do not contribute to the wear on the sensitive coated side. Still another advantageous feature of the invention is that all the threading and unthreading motions of the tape are initiated by moving a single mechanical drive element in the form of a handle, which can double as a carrying handle for the apparatus.

Other objects and advantages will emerge from the description of a preferred exemplary embodiment which is to be read in conjunction with the drawing.

THE DRAWING

DESCRIPTION OF THE PREFERRED EMBODIMENT

Figure 1:
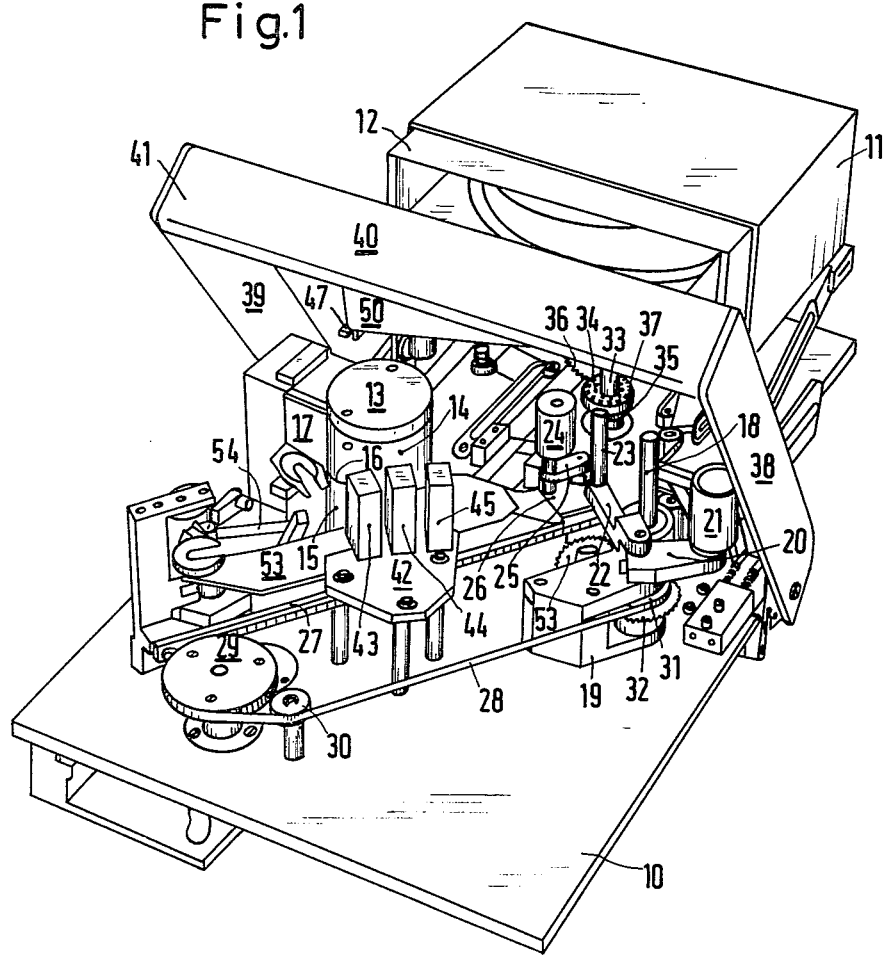
FIGS. 1–4 are schematic perspective views of the tape handling apparatus of the invention in successive stages of tape insertion.

Shown in FIG. 1 is a perspective view of a video tape recorder according to the invention in an initial stage prior to the threading of tape. The recorder has a base plate 10 with a movable receiver mechanism 11 placed on a lifting table for receiving a tape cassette 12. The cassette 12 contains two coaxial reels, and may be constructed substantially as described in application No. 10,816, filed Feb. 9, 1979, Wolf et al, now patent in which the magnetic tape is guided from one reel to the other in an inclined path. Mounted on the base plate 10 is a pickup or transducer mechanism 13 having two coaxial guide cylinders 14, 15 which define an annular gap 16 in which rotate one or more magnetic transducer heads which describe a series of parallel tracks which are inclined with respect to the edge of the tape. The magnetic tape is looped around the guide cylinders 14, 15 in a loop that extends approximately half way around the cylinders. Both cylinders 14, 15 are mounted on a holder 17 that insures their exact coaxial position. Further mounted on the base plate 10 is a rotating capstan 18 and a drive block 19 on which a pivotable arm 20 holds a rubber pressure roller 21 that can bear against the capstan 18 and apply pressure to the magnetic tape. A cylindrical tape guide element 23 is mounted on a pivotable lever 22. A tape deviating and counting roller 24 is rotatably mounted on an angled lever 25 in turn attached to a slide 26 which may move along a rail 27 driven by a gear belt 28. The gear belt 28 is moved by a drive disc 29 and passes over a deviating roller 30 and a belt gear 31 that is rigidly attached to a gear 32. Extending from the base plate and below the cassette are two concentric drive shafts, the interior of which defines an alignment stub or tip 33 and a face gear 34 while the outer drive shaft has a face gear 37 and carries a drive gear 35 which engages another gear 36. A handle 41 consisting of a central portion 40 and side plates 38 and 39 is attached by the latter to the base plate 10 in pivotable manner. The pivoting motions of the handle 41 provide the motive power for all of the mechanical motions of the apparatus necessary to thread and unthread the magnetic tape. Attached to a platform 42 mounted on the base plate 10 are three magnetic heads 43, 44, 45, which serve respectively to erase, record and reproduce signals on a longitudinal track on the magnetic tape.

FIG. 1 illustrates the position of the apparatus in which the cassette 12 has been placed within the receiver 11 and has not yet been engaged by any of the tape transport and holding elements of the apparatus.

Figure 2:
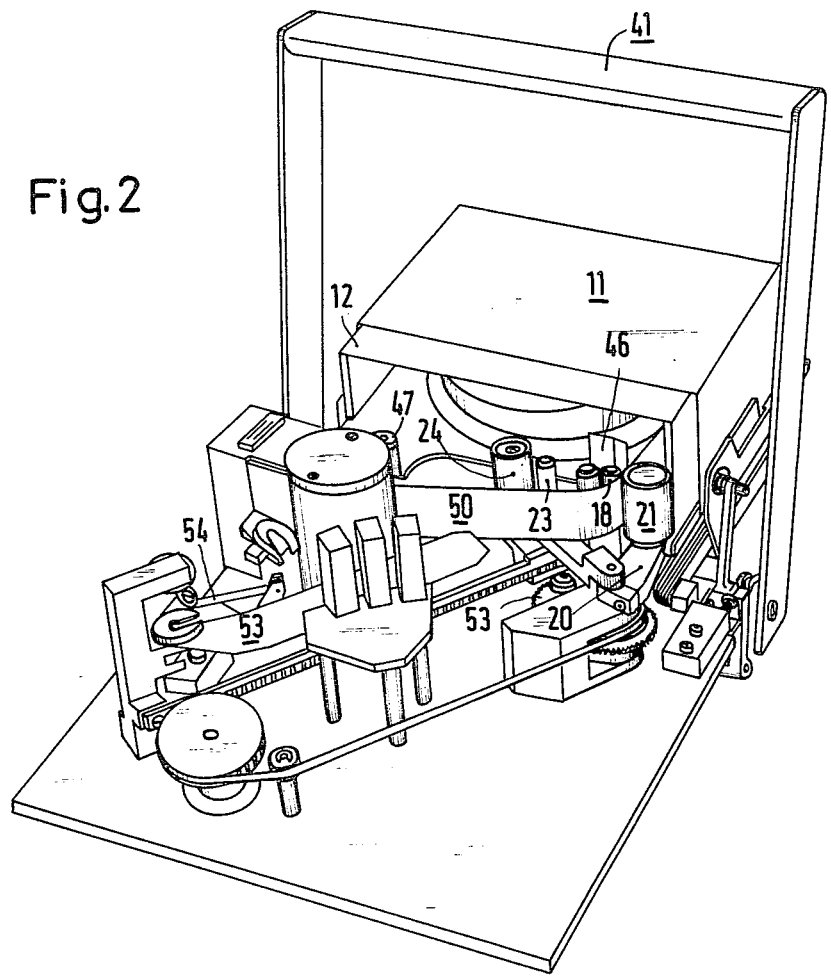

FIG. 2 illustrates the apparatus in a position in which the handle 41 has been moved by a portion of its angular range so as to initiate the tape threading process. By means to be described below, the cassette receiver 11 and the cassette 12 contained therein has been lowered from its initial position into the operational position. During the lowering of the cassette receiver, the face gears 34, 37 (FIG. 1) of the recording apparatus engage corresponding face gears on the tape reels within the cassette. The part of the magnetic tape between the reels in held in position by two tape guiding elements 46, 47 which are part of the cassette. During the lowering of the cassette, the tape guide element 23 as well as the tape counting roller 24 have been placed within the free tape loop 50 within the cassette, as has the tape drive capstan 18. A finger 51 on the pivotal lever 20 holding the pressure roller 21, best seen in FIG. 5, moves the tape guide element 46 belonging to the cassette out of the path of the magnetic tape 50 after the cassette has been lowered into the operational position and in a manner to be described later on. Another gear train, also to be described later, has moved the cassette tape guide element 47 out of the path of the tape 50. Furthermore, a deviating roller 52 (FIG. 5) belonging to the recorder has been inserted in the tape loop during the lowering of the cassette.

Figure 3:
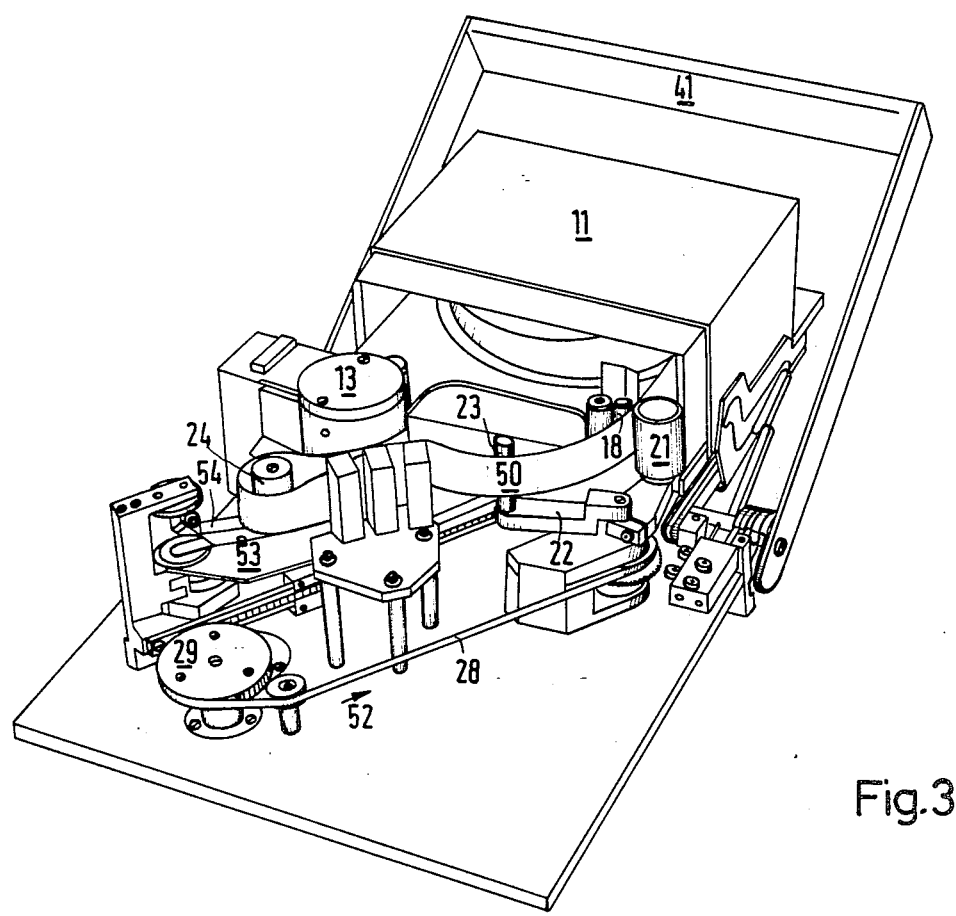

As the rotation of the handle 41 continues (see FIG. 3), the drive gear 29 drives the gear belt 28 in the direction of the arrow 49. The belt 28 drives the belt gear 31 which rotates the gear 32 connected to the gear 48 (FIG. 1). During the threading and removal process of the tape, the gear 48 is in engagement with the capstan 18. The above-described combination of gears accomplishes at the same time the longitudinal motion of the slide 26 on its track 27 as well as the rotation by the gear belt 28 of the gear 31 and the rotation of the gear combination 32, 48 as well as the capstan 18. When the tape is being threaded into the machine, tape is being taken from the upper tape reel in the cassette 12 whereas, in the tape removal process, tape is taken from the loop and returned to the cassette. The degree of rotation of the tape drive capstan 18 as a function of the path of the slide 26 on its track 27 is so chosen that the amount of tape delivered will be somewhat greater than required for the formation of the tape loop. In other words, the tape drive capstan 18, in cooperation with the pressure roller 21, delivers a little more than twice as much tape than the path traversed by the deviation and counting roller 24 during the threading process. The tape is held at the proper height in the threading process by tape guide foils 53, 54 (FIGS. 1, 3). Simultaneously with the onset of the threading motions of the magnetic tape 50, i.e., approximately at the beginning of the rotation of the capstan 18, and the beginning of the straight line motion of the counting and deviating roller 24, the tape guide element 23 is pivoted by the lever 22 from the position which it occupied during the lowering of the cassette receiver 11 and into its operational position, in the counterclockwise sense. The gear train which performs the pivotal motion of the tape guide element 23 will be described in detail later on.

Figure 4:
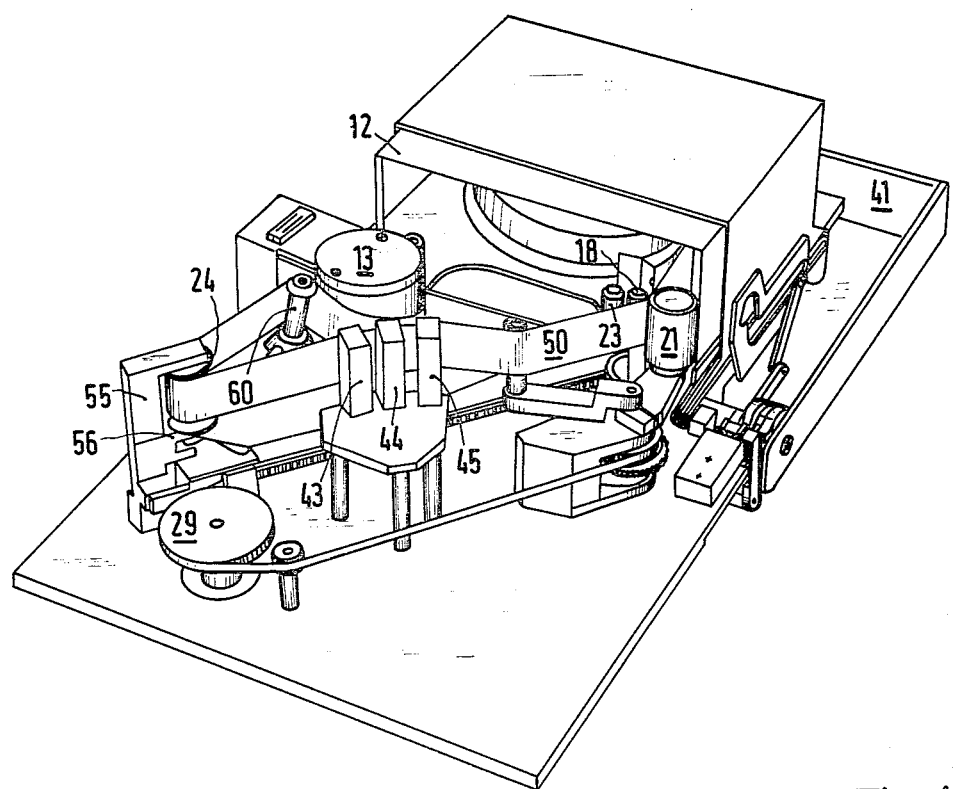

FIG. 4 illustrates the position of the various tape guide elements when the tape removal process is complete. The handle 41 has been rotated into its final position where it can also be used as a carrying handle for the entire apparatus. During the remaining pivotal motion of the handle 41, the belt gear 31 has been rotated further and a capstan 18, in cooperation with the rubber pressure roller 21, has removed an additional amount of magnetic tape from the upper storage reel. At the same time, the travel of the deviating and counting roller 24 is terminated by the arrival of the roller 24 in a prism-shaped receiver 56 which holds its central axis under spring pressure as will be described in detail below and thus defines the position of the roller 24 in space.

When the tape loop has been laid out as illustrated in FIG. 3, i.e., once the counting and deviating roller 24 has moved beyond the transducer device 13, a gear train to be described below pivots a roller 60, visible in FIGS. 5, 6 and 7, from a position below the tape path and locks it. The operational position of the roller 60 is illustrated in FIG. 4.

The complete path of the magnetic tape thus goes from the lower storage reel in the cassette 12 to a first deviating roller 52 (FIG. 5) whence it travels in a helix over an angle of approximately 190° around the transducer heads 13. From this point, the tape goes around its second deviating roller 60, (FIGS. 4, 5) around the counting roller 24 (FIG. 4), past the longitudinal magnetic heads 43, 44 and 45, further around the tape guide element 23 and finally to the capstan 18 against which it is pressed by the pressure roller 21 whereafter it is returned to the upper storage reel of the cassette 12.

Figure 5:
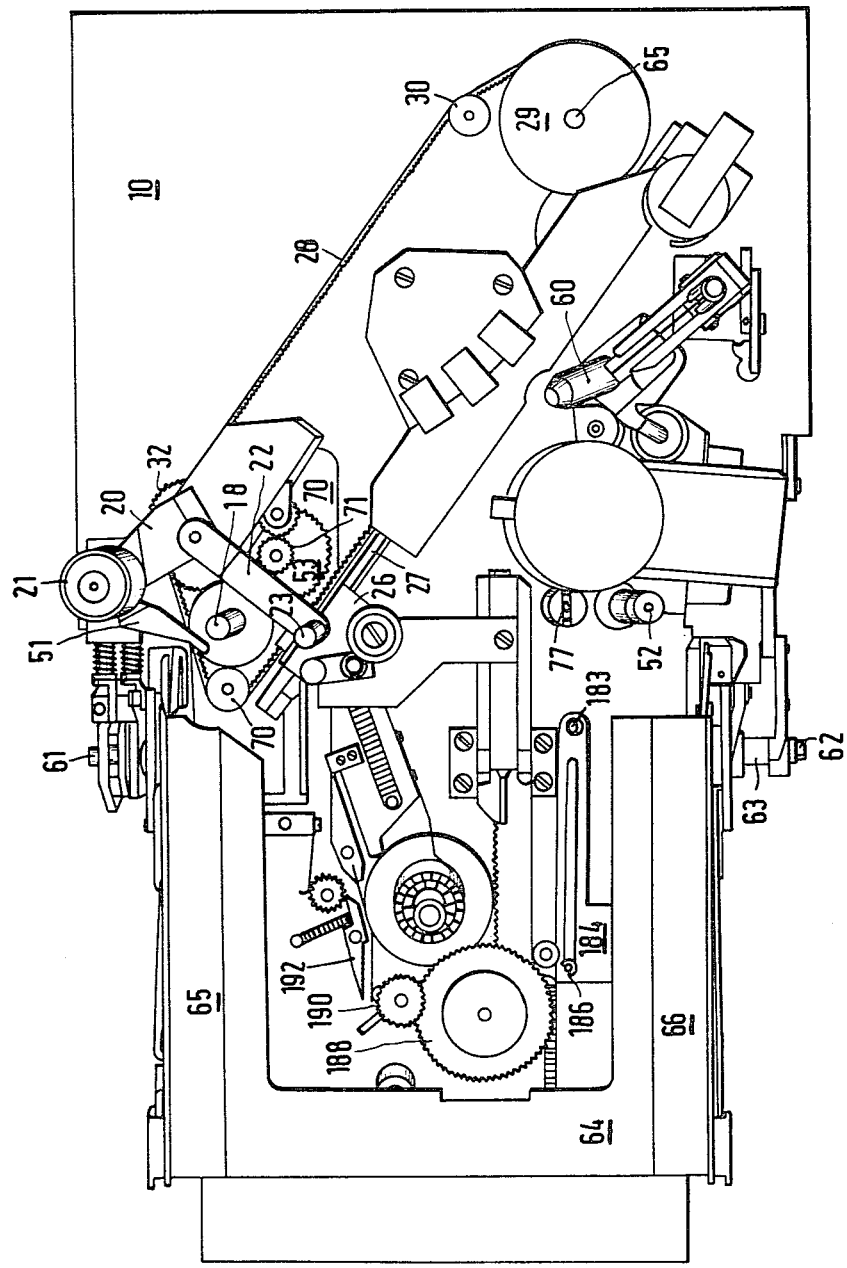
FIGS. 5–7 are top views of the tape recorder according to the invention in successive stages of tape threading.
Figure 6:
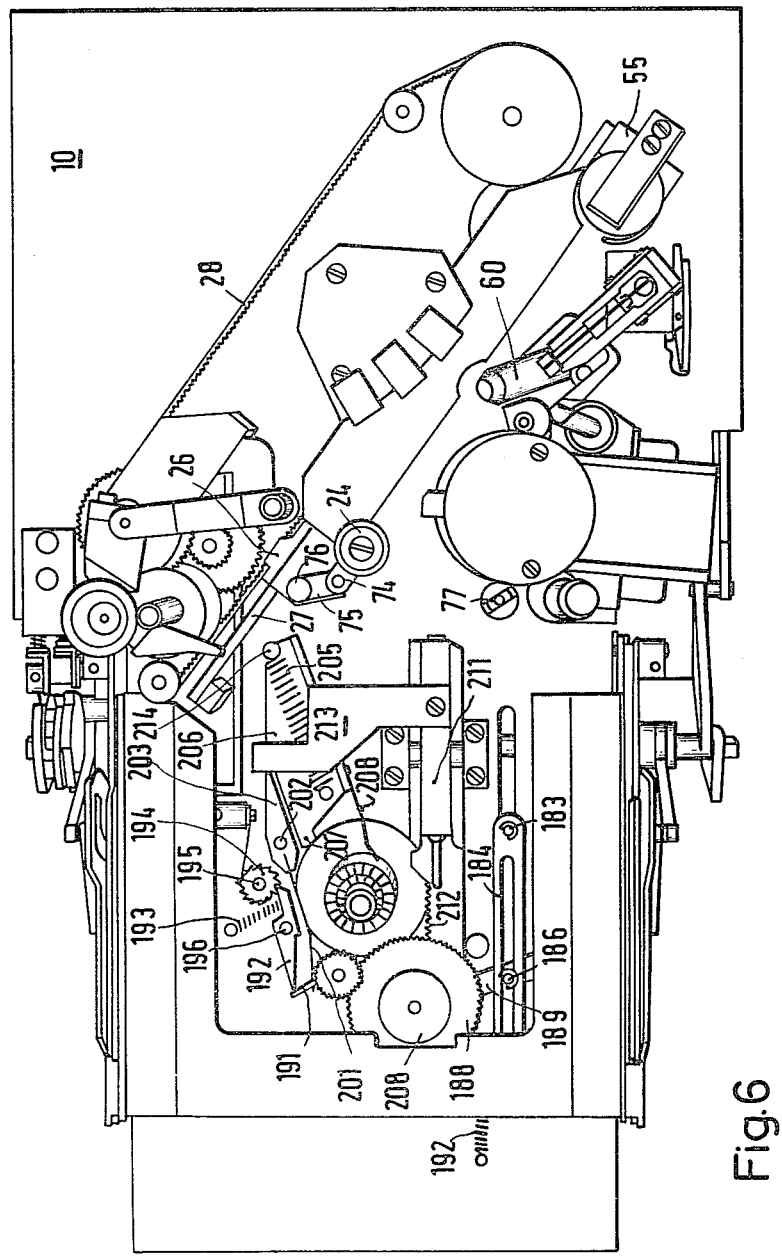
Figure 7:
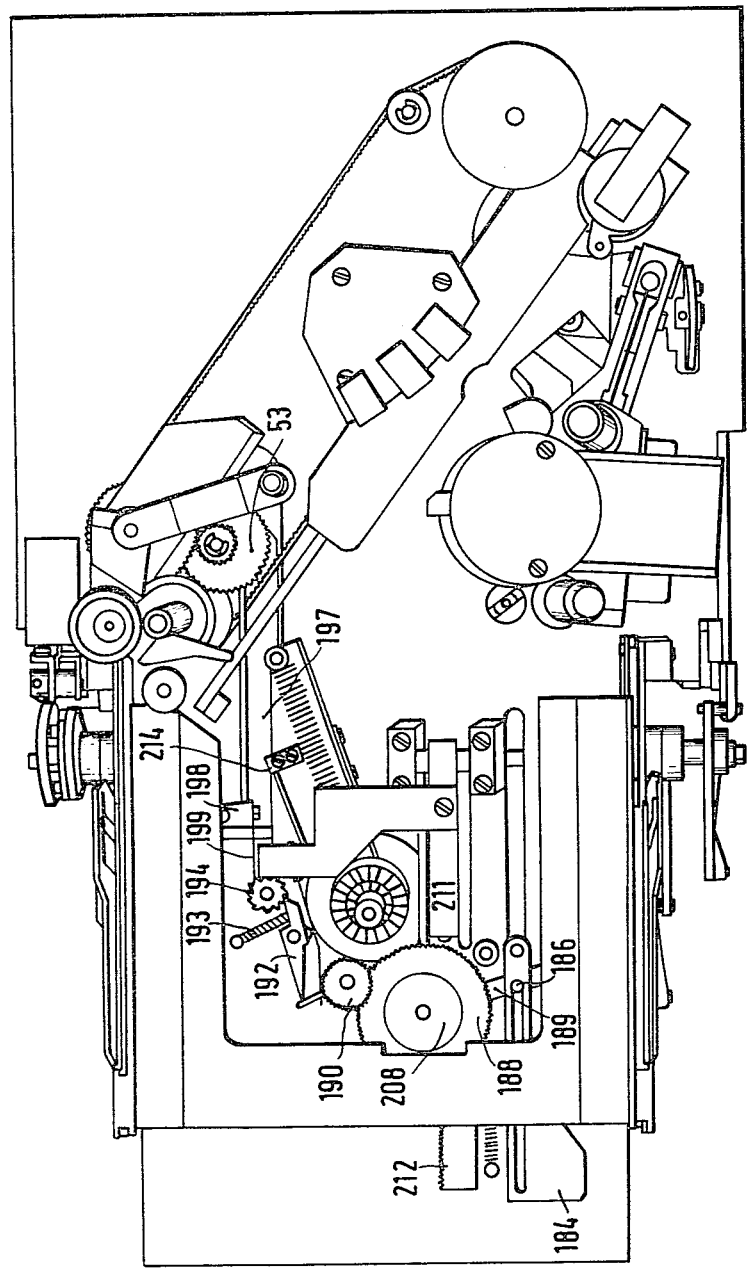

In FIGS. 5, 6 and 7, the actuating handle 41 is shown removed from its fastening points 61 and 62 at the tips of the drive shaft 63 for reasons of increased clarity. Similarly, the upper wall of the cassette receiver 11 has been removed so that the support table 64 and the tracks 65, 66 for the cassette become visible. The illustration of FIG. 5 corresponds to that of FIG. 1, i.e., the position of the tape guide and drive elements is shown prior to the lowering of the cassette table. The illustration of FIG. 6 shows the tape guide and drive elements after the onset of the tape threading process and FIG. 7 illustrates these elements at the termination of the tape threading process. The tape guide foil 54 has not been shown in any of the FIGS. 5, 6 and 7 so as to make visible the actuating mechanism for the deviating roller 60.

Figure 8:
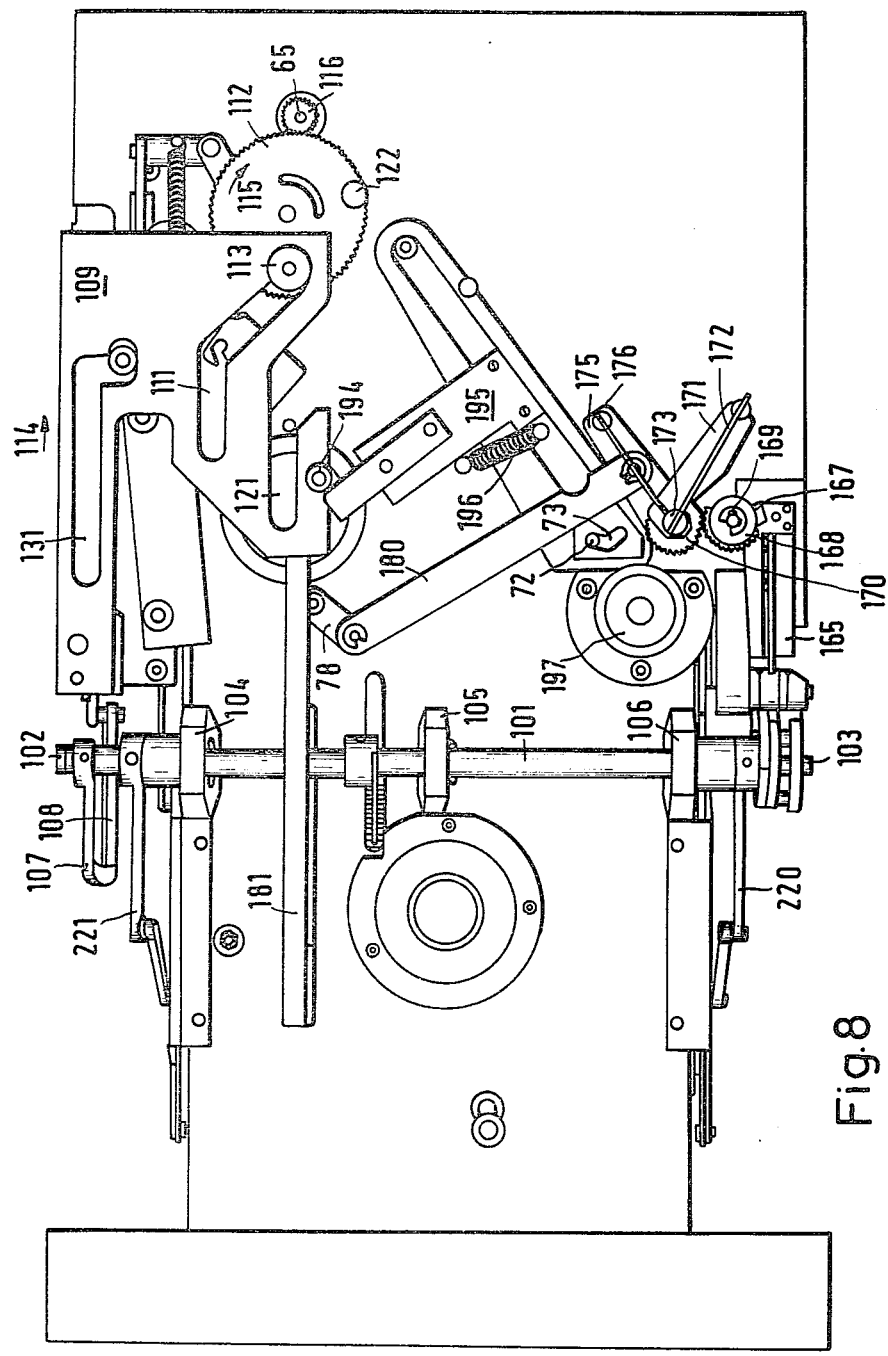
FIG. 8 is a bottom view of the tape recorder in the initial threading stage.

FIG. 5 shows that the drive disc 29 is mounted on a drive shaft 57 protruding through the base plate 10. The drive disc 29 drives the belt 28 which, after deviation by the roller 30, drives the gear 32 coupled to a further gear belt pulley 31 (FIG. 1). Subsequently, the gear belt 28 is further deviated by a roller 69 and its two ends are attached to the slide 26. The slide 26 glides on the track 27. The tape pressure roller 21 is rotatably attached to the pivotal lever 20 which has a common pivotal point with the pivotal lever 22 whose free end carries the tape guide element 23. The gear 32 is in engagement with the gear 71 via an intermediate wheel 70. The gear 71 shares the rotation of the gear 48 which in turn can be brought into engagement with a further gear, not shown, attached to the tape drive capstan 18. In order to insure that the gear drive of the tape drive capstan 18 by means of the gears 70, 71 and 48 is effective only during the tape threading process, the gears 70, 71 and 48 are carried on a drag lever whose pivotal point coincides with the axis of the gear 32 and whose lower side is equipped with a pin 72 which extends with play through the base plate 10 (FIG. 8) and which is displaced by a slotted guide 73.

FIG. 6 illustrates the same arrangement as shown in FIG. 5 and illustrates the apparatus approximately at the mid-point of the tape threading process. The deviating and counting roller 24 has been moved by the gear belt 28 along the track 27 in the direction of the stop 55. In order to place the roller 24 securely into the prismatic guide 56 of the stop member 55 at the end of the tape threading process, the roller 24 is mounted on an articulated lever 74, 75 which is biased in the counterclockwise sense, about the point 76 by a spring, not shown. When the slide 26 and the articulated lever 74, 75 mounted thereon arrives in the vicinity of its final position, the shaft of the roller 24 abuts against the prismatic receiver 56, the slide 26 is moved a small amount further and the spring which biases the articulated lever 74, 75 is subjected to an additional load.

Immediately after the onset of the threading motion of the tape, a pin 77 (FIGS. 5, 6) with two flat surfaces engages a corresponding lateral groove of the tape guide element 47 (FIG. 1) of the cassette and is rotated by the lever 78 (FIG. 8) attached to the pin 77 through an angle which causes the tape guide element 47 to be removed from the path of the magnetic tape 50.

As has already been discussed, all the motions of the tape guide and drive elements during the tape threading and tape removal processes from and to the cassette 12 are derived from and powered by the rotation of the handle 41. Some of the gear elements which transmit the pivoting of the handle to the various tape handling elements lie below the base plate 10 and some lie above it, still others are located at the two sides thereof. The following description will relate primarily to FIGS. 8-12. The main drive shaft 101 is coupled to the handle 41 by two square tips 102, 103 which engage corresponding square apertures in the two side portions 38, 39 (FIG. 1) of the handle 41. The main drive shaft 101 is held rotatably in three journals 104, 105, 106. The crank arm 107 is attached to an intermediate lever 108 the other end of which is attached to a slide 109 that glides on a guide 110 between two terminal positions. Accordingly, a rotation of the shaft 101 causes a linear displacement of the slide 109. The bottom of the slide 109 defines a first slotted guide 111 in which a crank pin 113 attached to a gear 112 can be displaced. When the slide 109 undergoes a linear displacement in the direction of the arrow 114 (FIG. 8) the crank pin 113 glides upwardly as seen in the figure into the inclined part of the slot 111 and rotates the gear 112 in the direction of the arrow 115. The gear 112 is engaged by a pinion, or small wheel 116 whose shaft 57 (FIG. 8) rotates in the base plate and whose top side (see FIG. 5) causes rotation of the drive disc 29 which powers the gear belt 28. Accordingly, the rotation of the gear 112 due to the motion of the slotted guide 111 causes a motion of the gear belt 28 which in turn moves the slide 26 and the counting and deviating roller 24 mounted thereon. The bottom of the slide 109 (FIGS. 8 and 9) defines a second slotted guide 121 engaged by a second crank pin 122 attached to the gear 112 but displaced by 90° with respect to the first crank pin 113. The second pin 122 defines the termination of the rotary motion of the gear 112 when the pin 113 is moving in the straight part of the guide slot 111 (see FIG. 9).

Figure 10:
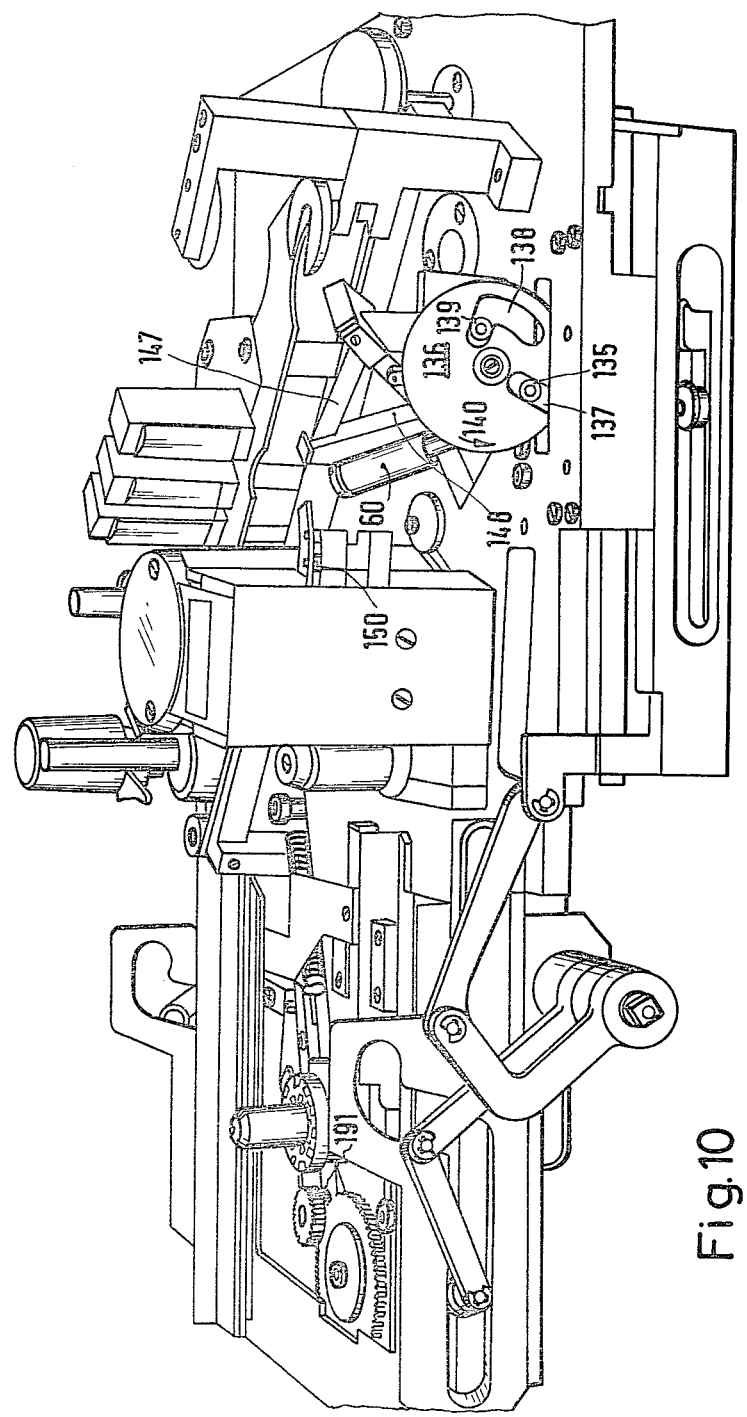
FIG. 10 is a side view of the apparatus in a first condition of threading.
Figure 11:
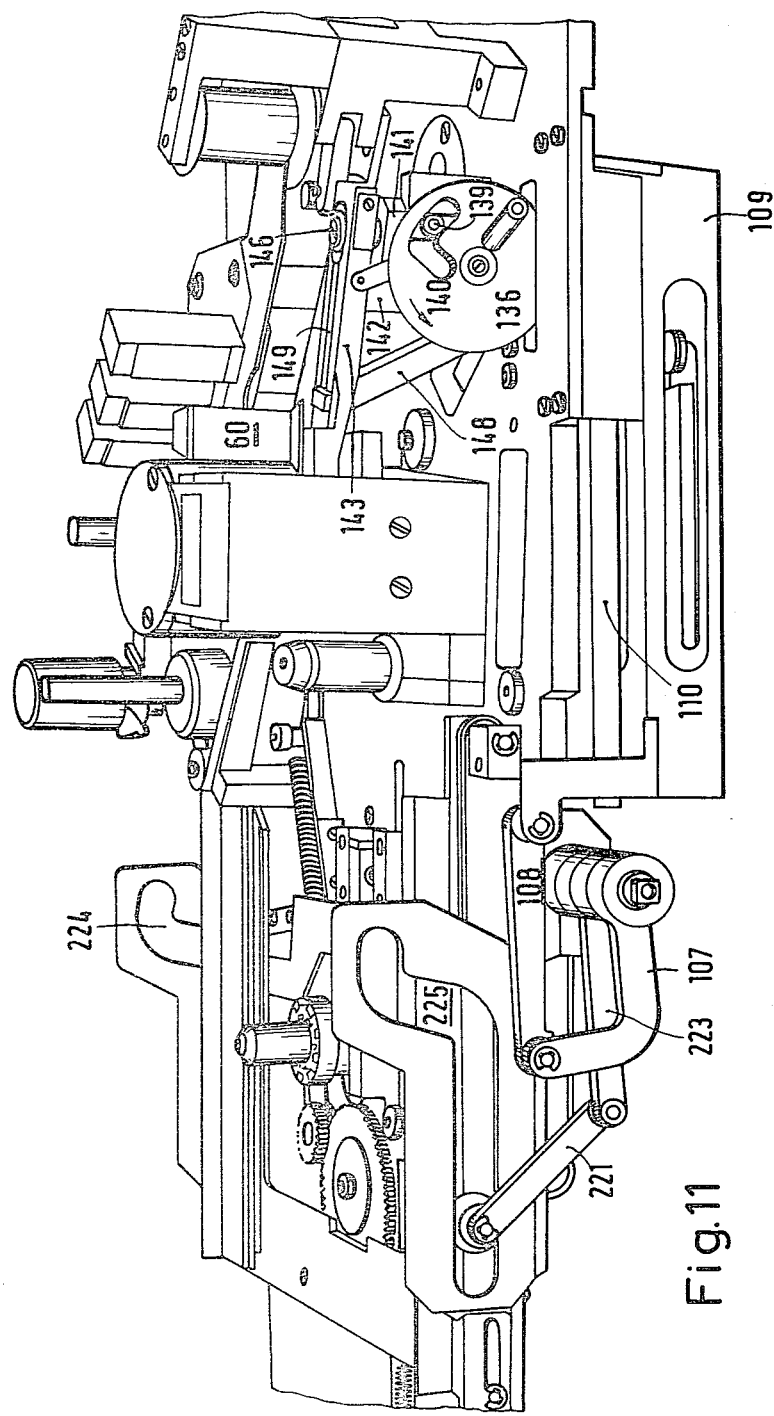
FIG. 11 is a side view of the apparatus in a second condition of threading.
Figure 1:
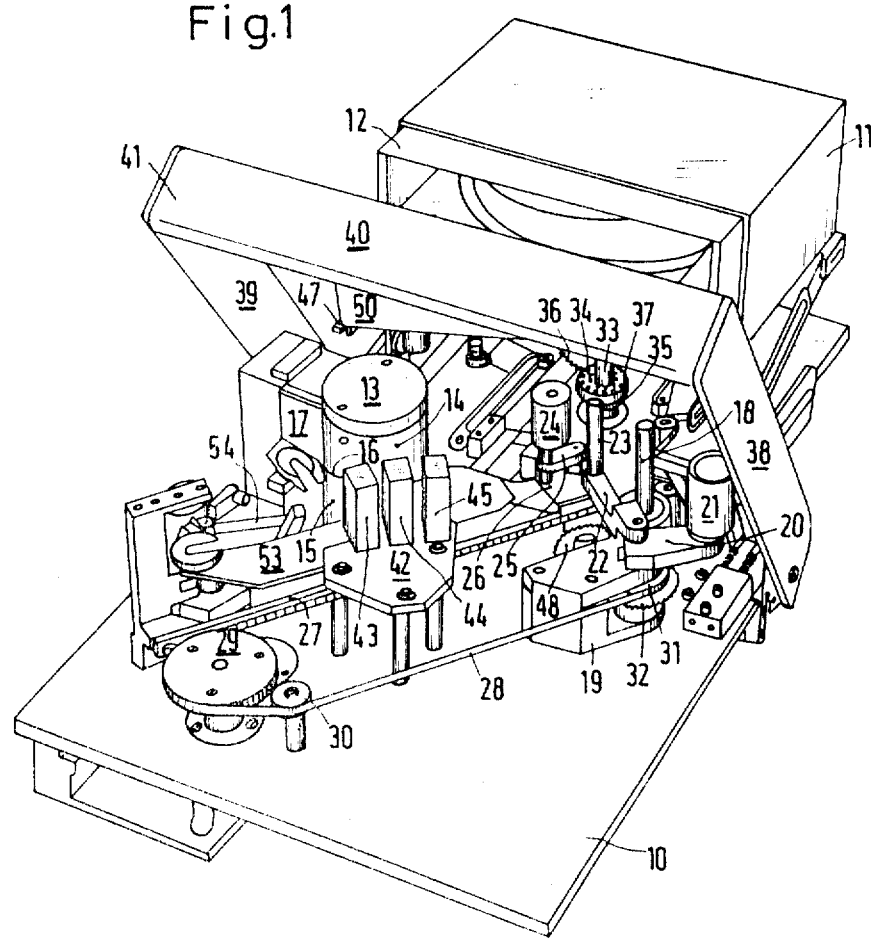
Figure 2:
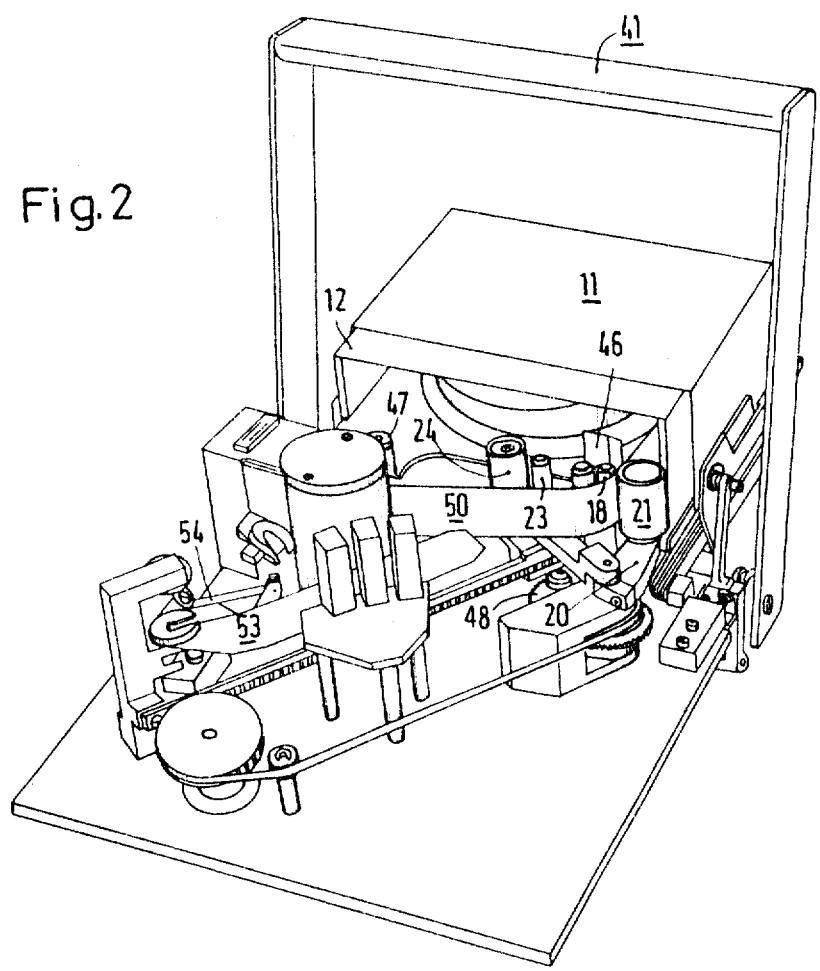
Figure 3:
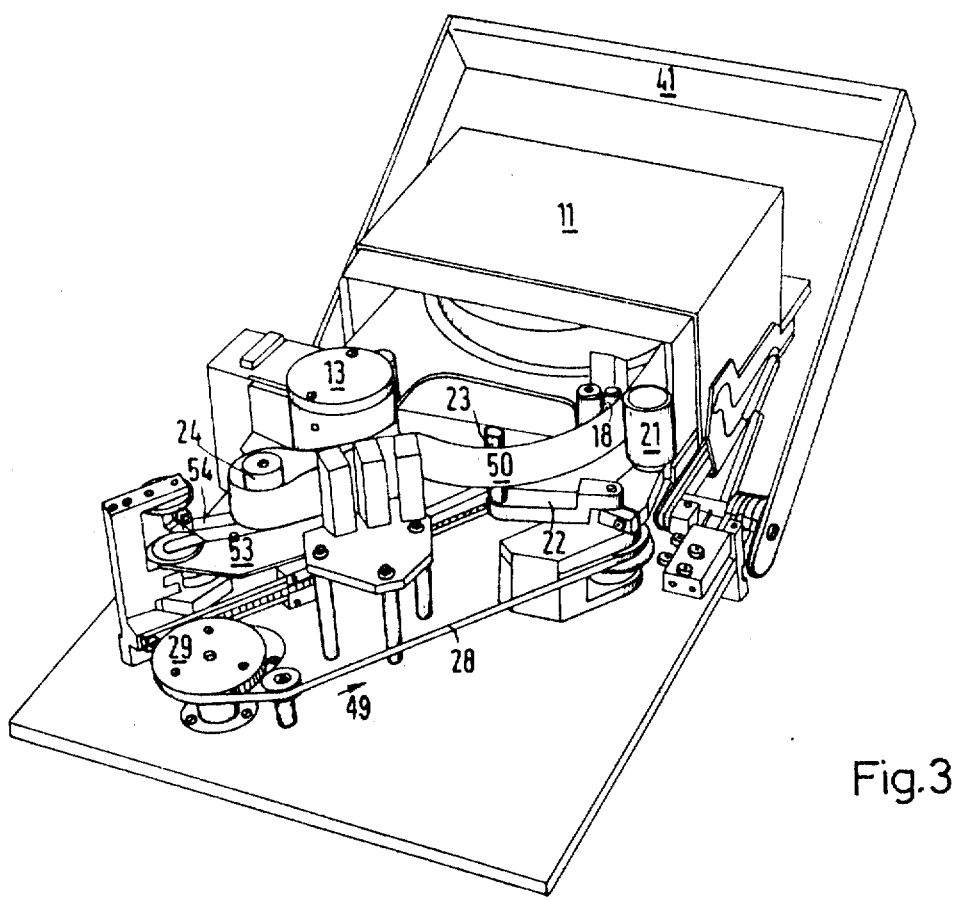
Figure 4:
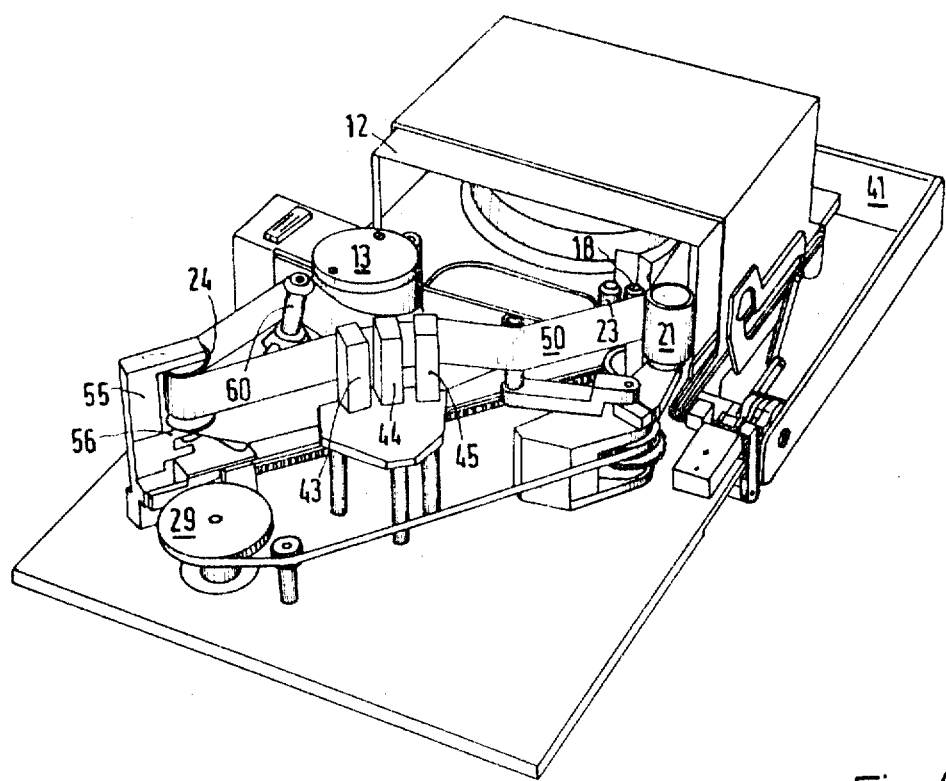
Figure 5:
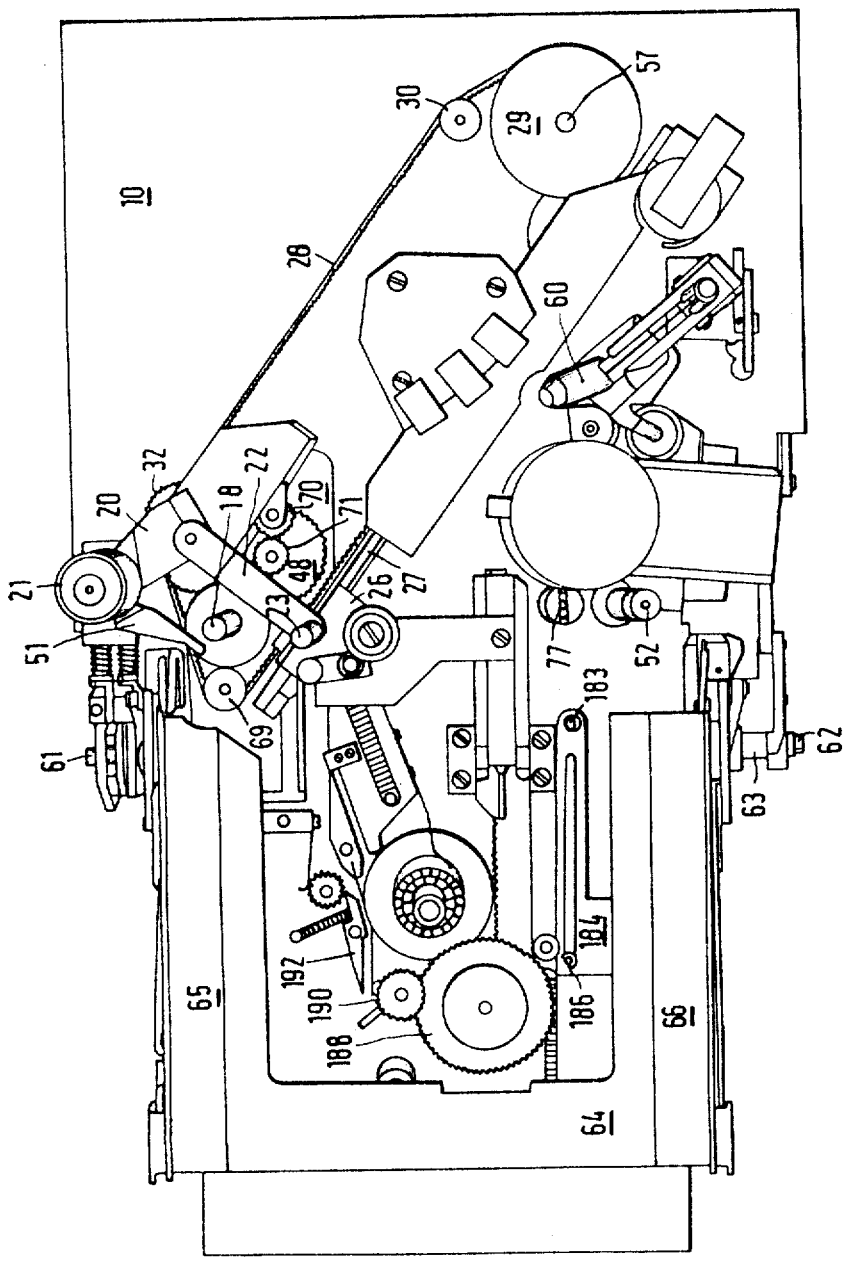
Figure 6:
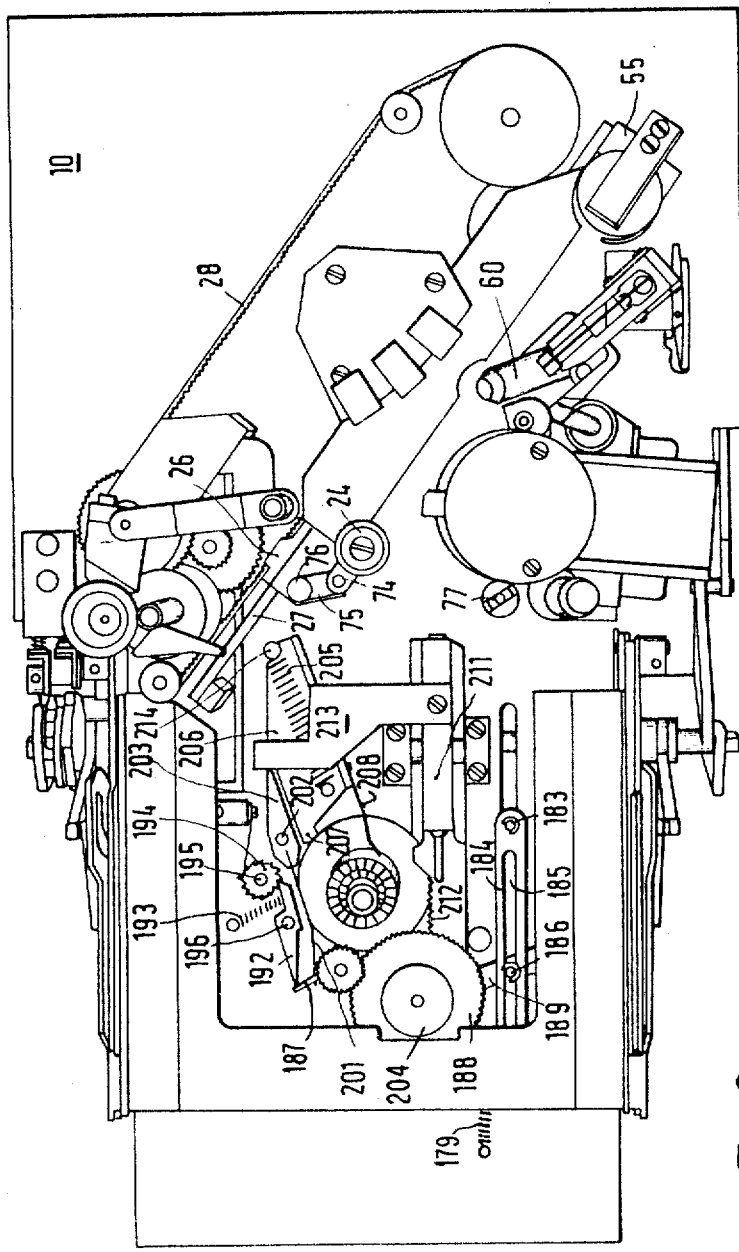
Figure 7:
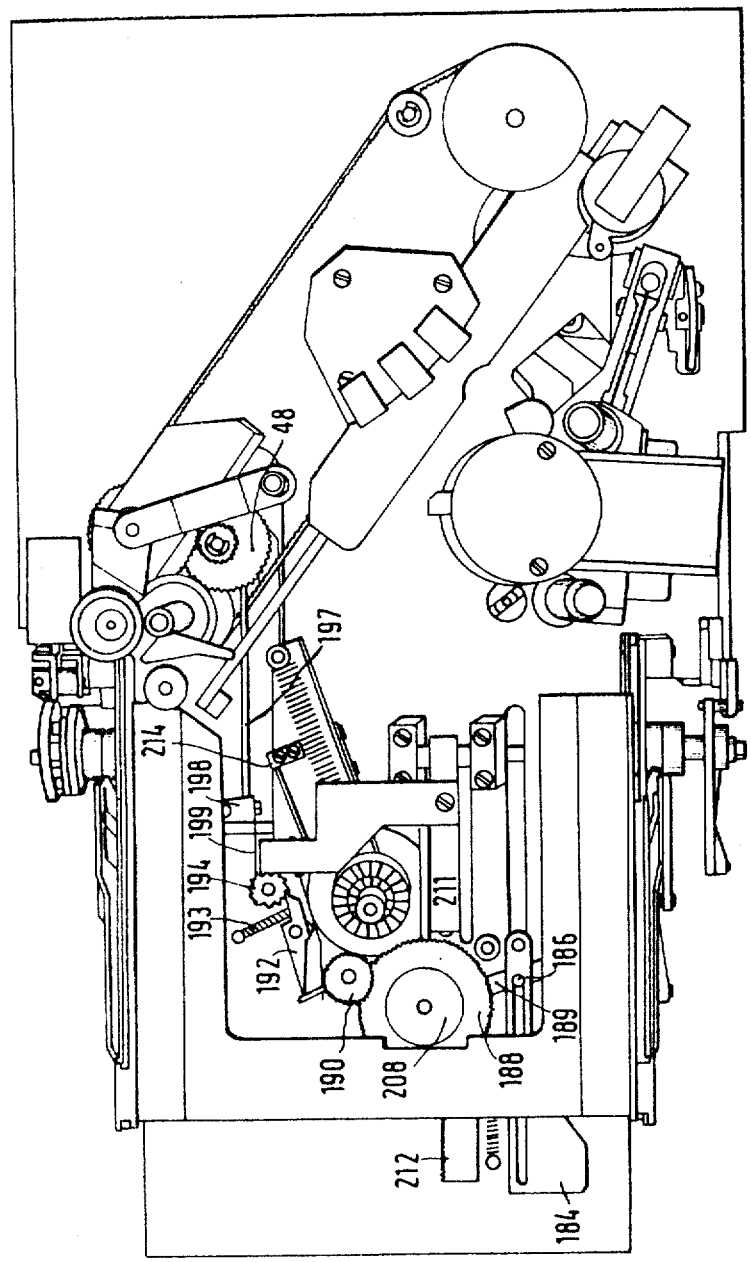
Figure 8:
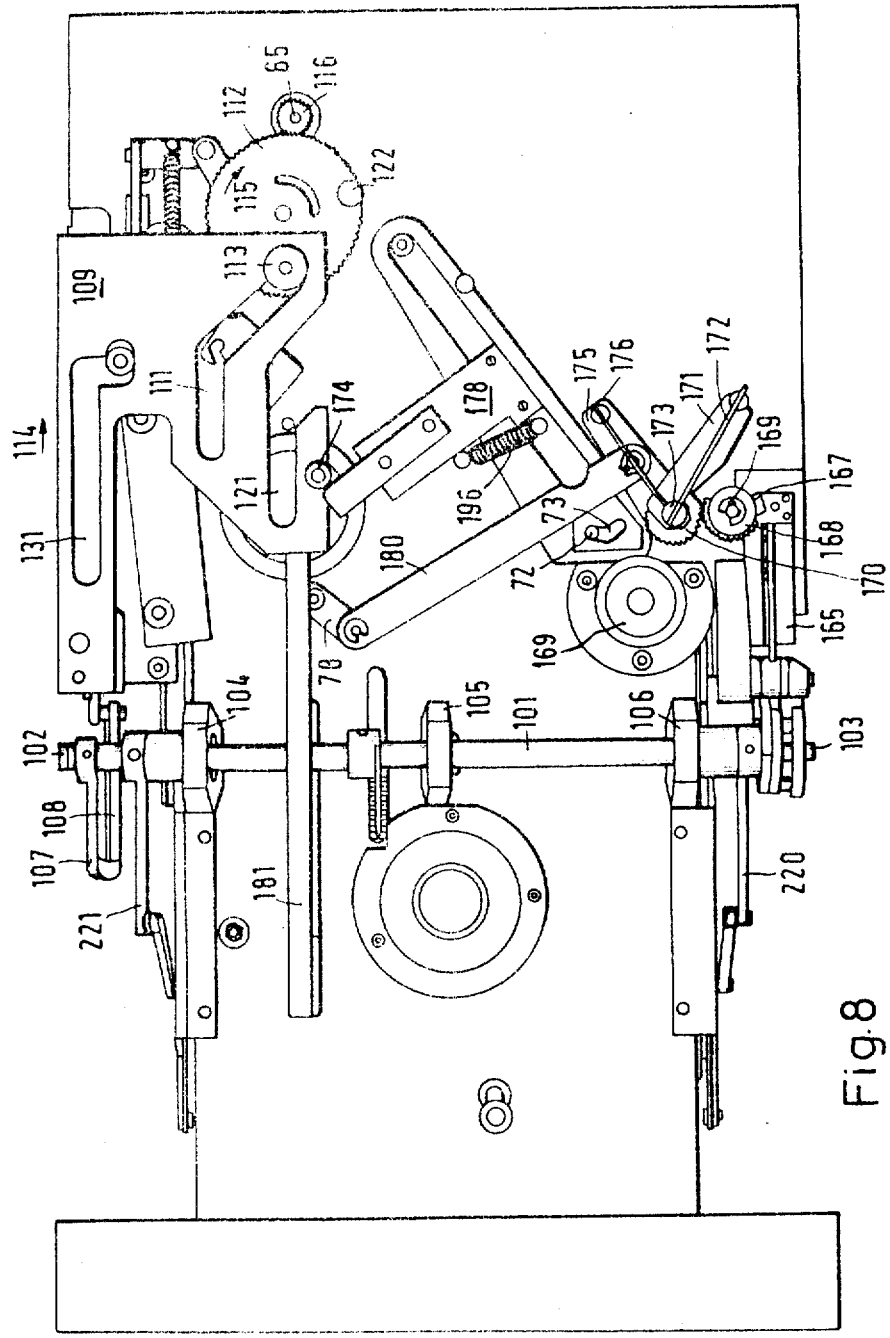
Figure 9:
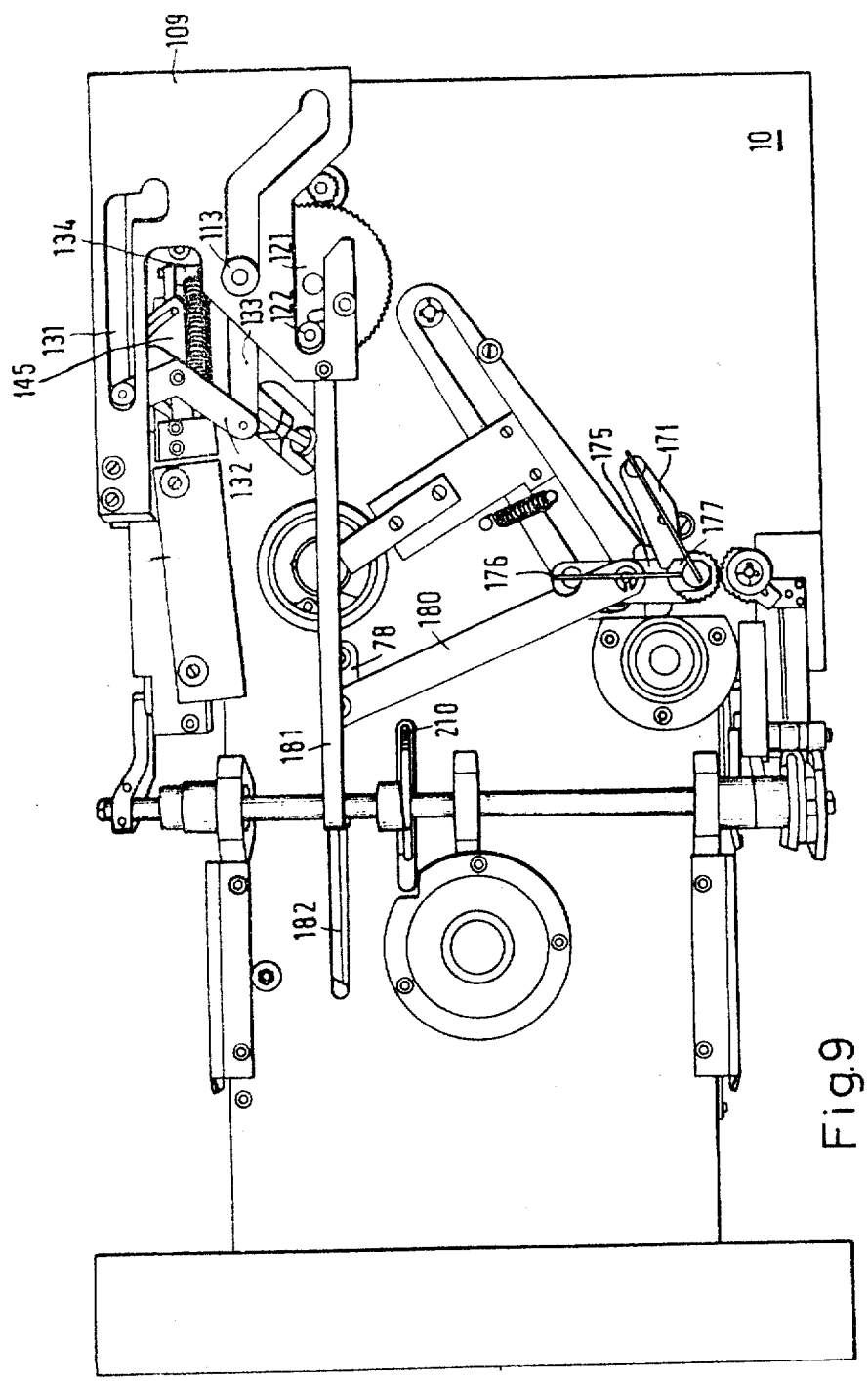
FIG. 9 is a bottom view of the tape recorder in the final tape threading stage.
Figure 10:
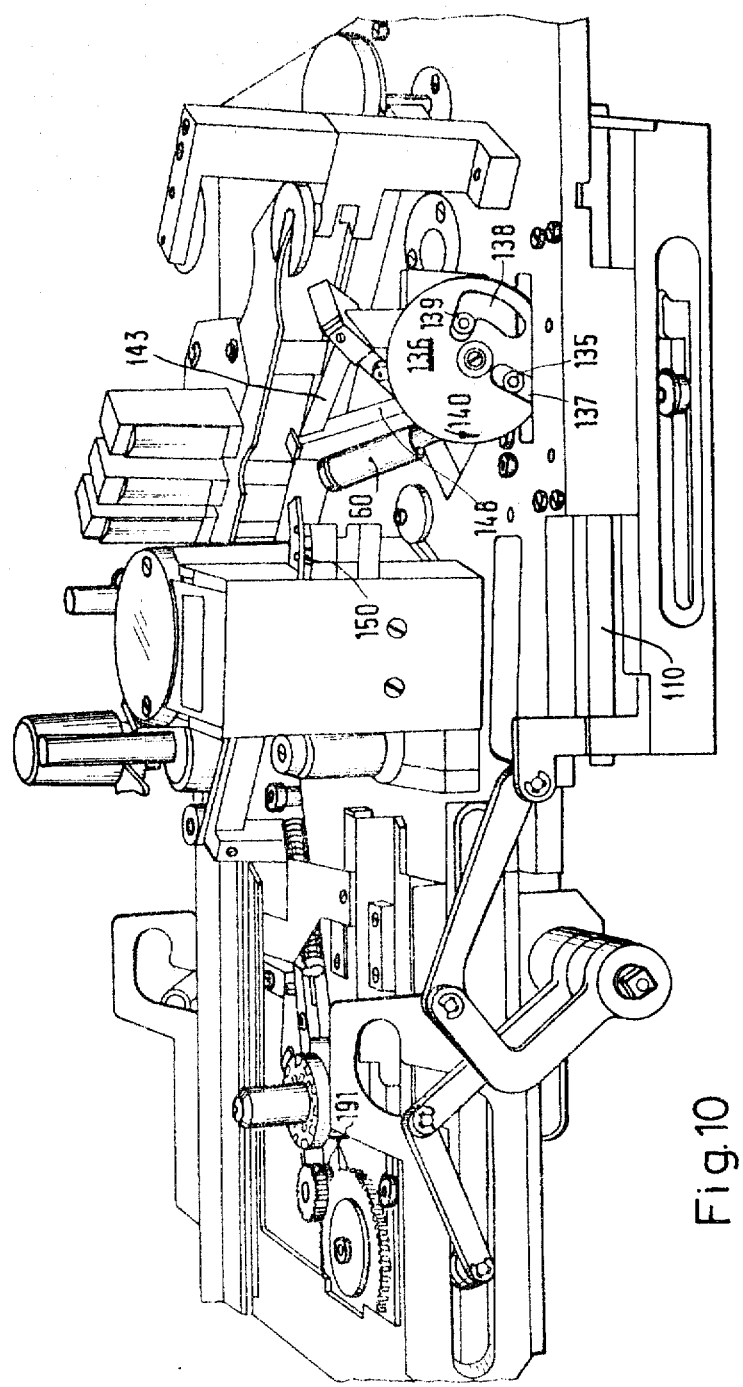

Positioning of deviating roll 60 (FIGS. 9 to 11).

A third guide slot 131 at the bottom of the slide 109 controls the motions of an angled lever 132 (FIG. 9)

which moves a slide 134 via a lever 133. When the slide 134 moves linearly, a pin 135 (FIG. 10) thereon glides in a slot 137 of a wheel 136 (FIG. 10) which is rotated thereby. A second slot 138 in the wheel 136 moves a pin 139 upwardly when the wheel 136 is rotated in the direction of the arrow 140 which lifts a slide element 141 coupled to the pin 139. The slide 141 moves on a cylindrical guide and carries short intermediate levers 142 which are attached to an arm 143 on which the deviating roller 60 is pivotably mounted. A slotted disc 145 (FIG. 9) is rotated by the slide 134 approximately at the end of the motion of the deviating roller 60. An arm 143 is attached to the slotted disc 145 by a shaft 146 in a manner which transmits rotation. Extending from the free end of the arm 143 is a guide 148 which extends in the direction of the arm 143. Arm 143 has a longitudinal groove 149 which receives the guide 148. When the slotted disc 145 is rotated, the arm 143 and the guide 148 and hence the roller 60 are all rotated so that the axis of the deviating roller 60 is pivoted into a prismatic guide 150.

Positioning the pivotal levers 20 and 22 which are mounted concentrically in the block 19 and which carry respectively, the pressure roller 21 and the tape guide element 23 (FIGS. 8, 9, 12), levers 20, 22 are moved by two cam plates 160, 161 (FIG. 12) which are mounted on the main drive shaft 101 near the square drive tip 103. The cam plates 160, 161 are coupled by levers 162, 163, respectively, that pivot on a comman shaft 164 to actuators 165, 166, respectively. The actuator 165 (FIG. 8) rotates a gear segment 168 via a crank 167. The gear segment 168 engages a further gear segment 170 on a crank 171. The free end of the crank 171 carries a leaf spring 172 whose other end engages a slot in a shaft 173 of the pivotal arm 22. Operation: When the rotary motion of the handle 41 rotates the main drive shaft 101, the cam plate 160 pivots the lever 162 which moves the actuator 165 that turns the crank 167 and its gear segment 168. The cooperating gear segment 170 then rotates the crank 171 whose motion is transmitted via the leaf spring 172 to the shaft 173 whose other end carries the lever 22 and the tape guide element 23. The reliable positioning of the tape guide element 23 into its final position defined by a stop, not shown, is insured by so choosing the gear ratios and/or the path of the actuator 165 that the crank 171 is rotated enough to stress the leaf spring 172.

The cam plate 161 and its associated lever 163 operate in a similar manner to that described above. The actuator 166 moves a gear segment mounted coaxially to the gear segment 168 (FIG. 8) which in turn engages a further gear segment that is coaxial with the segment 170 but can rotate independently thereof. The latter gear segment is attached to the crank 175 which rotates therewith and whose free end holds another leaf spring 176. The leaf spring 176 engages a segment 177 mounted coaxially with respect to the shaft 173 on a hollow shaft which carries the lever 20 that supports the pressure roller 21. Attached to the crank 175 is a lever 180 (FIG. 9) which engages a further lever 78 that actuates the pin 77 which engages the tape guide element 47 (FIG. 1) of the cassette.

Initial rotation of capstan to feed tape for threading (FIGS. 5-8).

A push rod 181 connected to the slide 109 extends through a groove 182 of the base plate 10 and its upper end carries a pin 183 to which is attached a slotted lever 184. Sliding in the slot 185 of the lever 184 is the guide pin 186 of a two-armed lever 189 (FIG. 7) mounted concentrically with respect to the gear 188. Carried on the free end of the lever 189 is a gear 190 which is attached to an intermediate gear 191 (FIG. 10) and shares in its rotation. The intermediate gear 191 engages the gear 188. The lever 189 has an extension 187 which is pressed by a spring 179 against a two-armed lever 192 (FIG. 5) which is pulled by a spring 193 against a lock wheel 194 carried on a shaft 195. The lever 192 is mounted on a shaft 196.

A pin 174 attached to the bottom of the slide 109 cooperates with the long arm of a T-shaped lever 178. In the terminal phase of the tape threading process, the pin 174 abuts against the lever 178 and displaces it (FIG. 8) against the force of a spring 196 in the clockwise sense so that the pin 72 in the guide slot 73 executes a movement away from the journal 169 of the tape drive capstan 18. Attached to the slot-following pin 72 is the gear combination 70, 71, 48 illustrated in FIG. 5 and described therewith, so that the motion of the guide pin 72 moves the gear 48 into disengagement from the tape drive capstan 18. Subsequently, the capstan can be driven during the recording and playback phase in any suitable manner, for example by an electric motor whose speed can be precisely controlled. When the gear 48 is pivoted, a rod 197 attached thereto pivots a two-armed lever 198 (FIG. 7) causing a leaf spring 199 to move by one step over the teeth of the stationary lock wheel 194.

Figure 12:
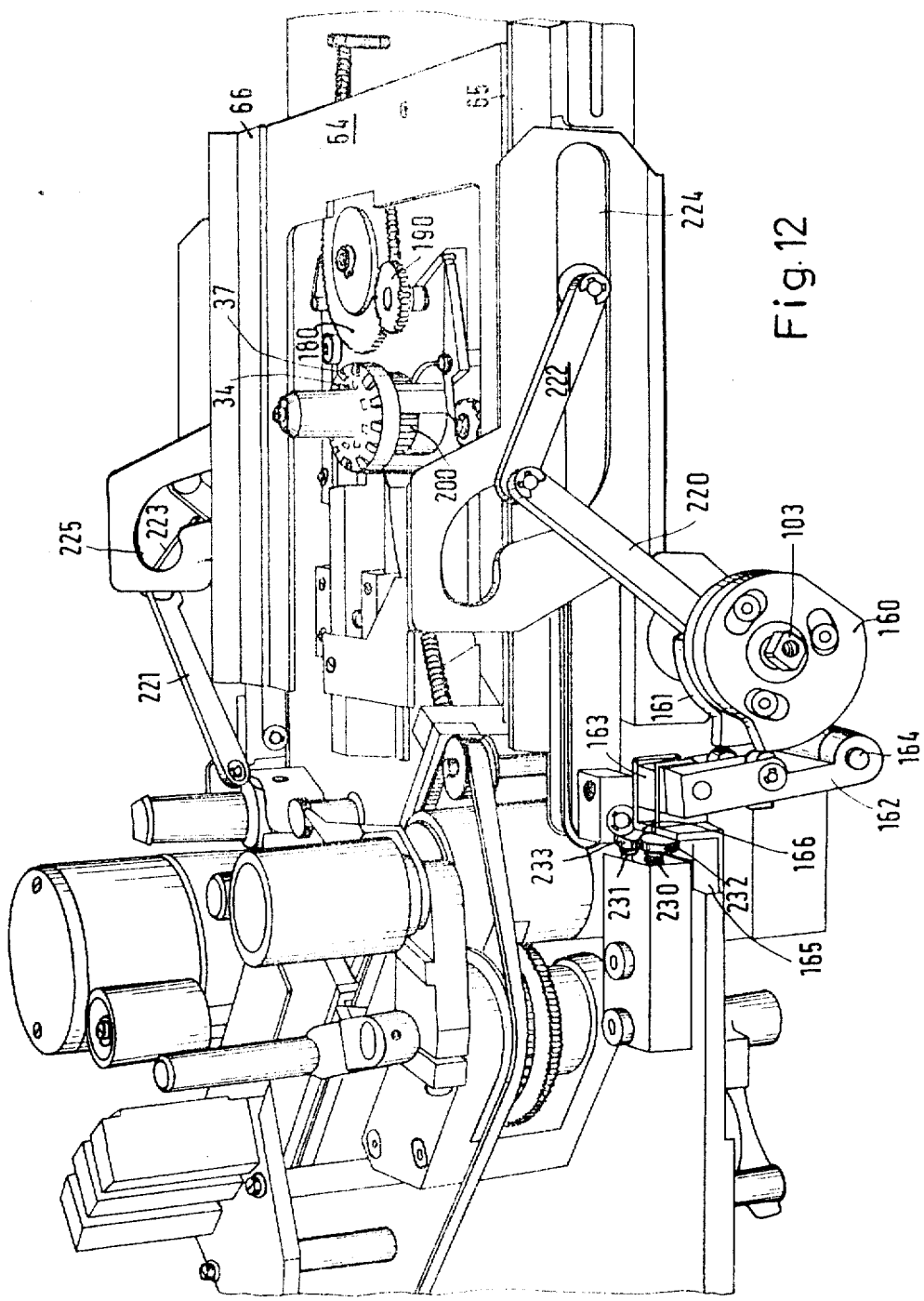
FIG. 12 is a side view of the apparatus illustrating tape transport elements.

When the recording or reproduction process is finished, and it is desired to remove the tape cassette 12 from the tape recorder and playback apparatus, the handle 41 is moved from the position shown in FIG. 4 by rotating it in the direction of the position illustrated in FIG. 3. This motion of the handle 41 causes the T-shaped lever 178 to be released by the pin 174 and to be pulled back into its initial position by the tension spring 196. As a result, the guide pin 72 moving in the guide slot 73 is displaced into the position in which it brings the gear 48 into engagement with the gear mounted on the shaft of the tape drive capstan 18. The rod 197 attached to the shaft of the gear 48 moves the leaf spring 199 via the two-armed lever 198 and rotates the lock wheel 194 by one tooth. On the side of the lock wheel 194 remote from that side which is engaged by the leaf spring 199, the lever 192 passes across one tooth of the lock wheel 194 and releases the extension 187 of the lever 189. The tension spring 193 now rotates the lever 189 clockwise and the gear 190 is brought into engagement with a gear 200 that shares the rotation of the interior straight gear 34 (FIG. 12).

At the same time, the extension 187 diminishes the pretension of a leaf spring 201 which constitutes the extension of a lever 203 pivoted at the point 202 and the lever 203 releases a slide 206 which is pretensed by a spring 205. The slide 206 has a protrusion 207 and a leaf spring 208 which, together constitute a lock mechanism for the frontal gear 37.

If the handle 41 is lifted still further and the magnetic tape is returned to the cassette due to the mechanical drive of the tape capstan 18, the simultaneous driving of the face gears 34 and the locking of the gears 37 rotates the upper tape reel of the cassette 12 which thereby winds up the tape pulled from the apparatus. In order to insure that all the tape contained in the tape loop is actually wound up regardless of the degree of loading of the reels, the hub 204 of the gear 188 is rotated so fast that even if only a small amount of tape is contained on the wind-up reel, and thus its effective diameter is small, the amount of tape wound up is still sufficient. A slip clutch is disposed between the hub 204 and the gear 188. The hub 204 is driven by a gear segment 210 mounted on the main drive shaft (FIG. 9) which engages a rack attached to the bottom of the slide 211 (FIGS. 6 and 7). A further rack 212 attached to the slide 211 on the top of the base plate 10 drives the hub 204 via a gear, not shown.

The slide 206 is returned by a foil 213 attached to the slide 211 so that after the tape is returned to the cassette and the cassette is lifted by the further motion of the handle 41, the foil 213 abuts against the pin 214 and pulls back the slide 206 far enough so that the lever 203 (FIG. 6) bears against the cam 214 and causes the spring 208 to be disengaged from the gear teeth 37.

Attached to both ends of the drive shaft 101 (FIG. 8) are cranks 220, 221 which rotate with the shaft 101 and which cause the lifting and lowering of the cassette receiver 64, 65, 66 via intermediate levers 222, 223 and associated slot guides 224, 225. The lifting table for the cassette receiver 64, 65, 66 is of a known scissors-type construction and will not be described in further detail.

When the machine is in actual use, i.e., when information is being recorded or played back, the tape is put under operational tension by a drive mechanism including an electric motor and a gear train one of whose output elements engages the gear teeth 34 and another one of whose output elements engages the frontal gear teeth 37. For example, an electric motor may be used which drives the gears 34 via an appropriate transmission and whose rotor is coupled to the gear teeth 37. Power may be supplied to the motor, for example, by slip rings. The advantage of such a disposition is that, when the two storage reels in the cassette rotate in the same sense, the electric motor needs to compensate only the differential rotational speed of the reels when the degree of wind-up is different. The rpm range of the motor is thus relatively narrow which makes it simpler to choose a motor that satisfies special requirements of the apparatus. The employment of a gear train on the drive shaft of the motor causes an increase of the rotational torque so that a relatively small, light motor with low power consumption may be employed. At the same time, the very small differential speeds between the two gears 34 and 37 are translated into rapid rotation so that, during most of the operation, the motor does not have to operate at near standstill which would entail increased current consumption.

With respect to the actuators 165 and 166, best seen in FIG. 12, it should be noted that springs 230, 231 and associated respective pins 232, 233 engage the actuators 165 and 166 in such a way that the cam-following levers 162 and 163 are in continuous contact with the cam suface of the cam wheels 160, 161.

Various changes and modifications may be made within the scope of the inventive concept.

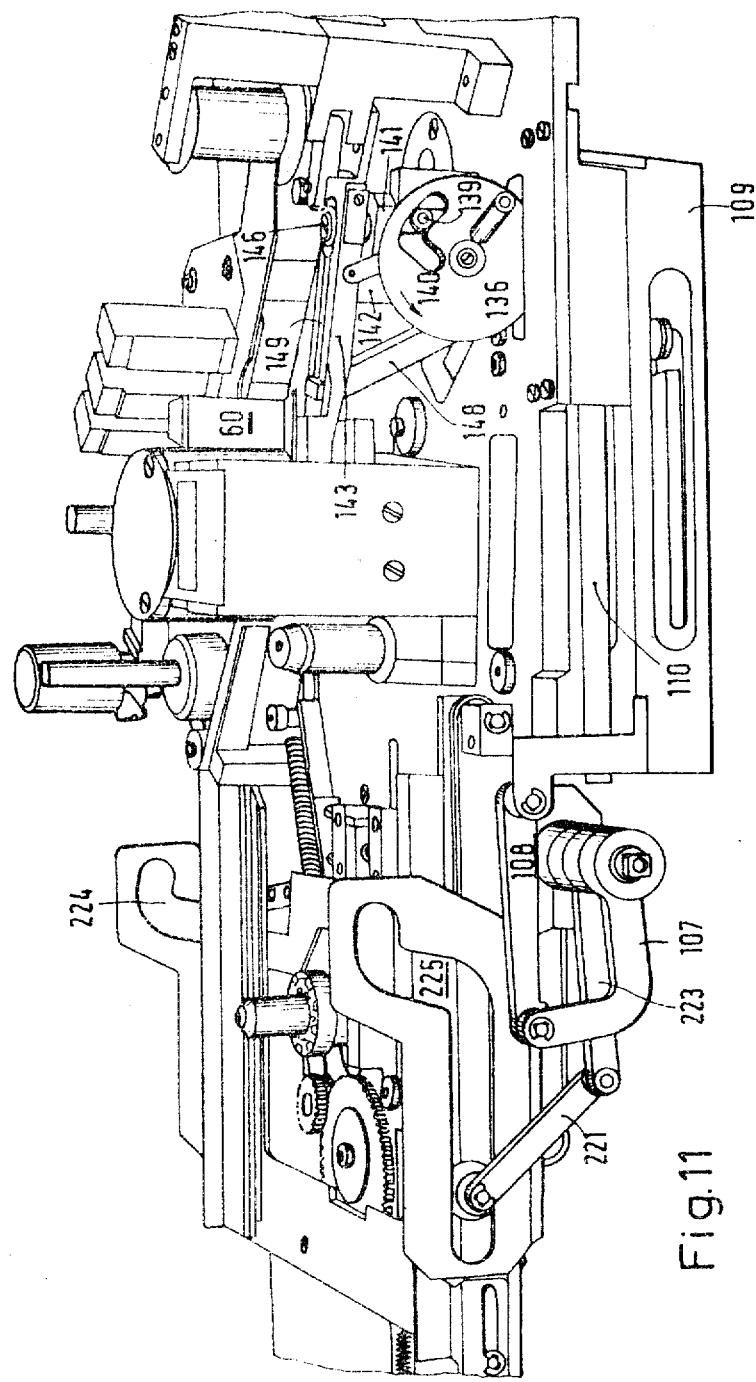

We claim:

1. Apparatus for transducing information on or from magnetic tape having
   a support (10); means to support two axially stacked reels holding magnetic tape, preferably contained in a cassette;
   tape guiding elements to guide the tape to follow a predetermined path;
   electromagnetic transducer elements (13, 14, 15, 16; 43, 44, 45) positioned along said predetermined path;
   a tape driving capstan (18);
   a pressure roller (21);
   means (20) for selectively urging said pressure roller against said capstan to feed tape upon rotation of the capstan,
   the capstan (18) being positioned on the support (10) and so located along said predetermined path that the magnetic tape comes to lie between the drive capstan and said pressure roller;
   an operating handle (41) to effect threading of the tape to become positioned in said predetermined path, or restoring of tape, after having been positioned in said path, in the respective reels; and
   drive means (101, 102, 103) coupled to the operating handle and further coupled to said drive capstan (18) to rotate the tape capstan upon operation of the handle, and hence positively feed tape from a respective reel to permit said tape to follow said predetermined path without stress on the tape separate from the pull exerted on the tape by the drive capstan; and further including pressure roller engagement control means (20, 32, 48, 70, 71) coupled to said drive means (101, 102, 103) and moving said pressure roller towards the capstan, with the tape therebetween, upon movement of the operating handle (41) and thereby provide the positive tape feed.

2. Apparatus according to claim 1, further comprising a slide track (27) secured to the support (10) and extending in a direction of at least a portion of said predetermined path;
   a tape deviating roller (24);
   means (26) movably supporting said tape deviating roller on said slide track (27);
   a mechanical motion transmission means (18, 29, 32, 48, 57, 70, 71) coupling said drive means (101, 102, 103) and the deviation roller support means (26) to move the deviation roller (24) along the slide track upon movement of the operating handle (41) to position said tape in said path as the tape is being fed from a respective reel by rotation of said capstan (18).

3. Apparatus according to claim 2, wherein the mechanical motion transmission means coupling the deviation roller support means (26) includes
   a gear coupled to the capstan (18); and
   wherein the motion transmission of the deviating roller support means (26) and the rotary speed of the drive capstan (18) is selected to effect, during the tape threading operation, a surface or peripheral speed of said drive capstan (18) which is related to the speed of movement of the deviating roller support means (26) along said track in such a way that the amount of tape transported by said capstan in said predetermined path exceeds the length of said path, and hence required when the tape is in operating position for transducing of information therefrom,
   whereby the tape being positioned and placed in said path is positioned therein free from stress.

4. Apparatus according to claim 3, wherein the motion transmission means includes a releasable coupling to effect driving connection only during tape threading and tape restoring of the reel but not during information transducing.

5. Apparatus according to claim 2, wherein the deviating roller has a terminal position remote from said reels, and the slide track is approximately straight between a threading position adjacent the reels and the remote terminal position.

6. Apparatus according to claim 2, wherein the drive means comprises a rotatable drive shaft (101); and
   the mechanical motion transmission includes a crank mechanism coupled to said drive shaft, a slide (109) movable by said crank mechanism and having at least two slot guides (111, 121), and means engaged by one of the slot guides to rotate a first gear train; and
   a gear belt (28) movable by said first gear train, the tape deviation roller support means (26) being coupled to and moved by said gear belt.

7. Apparatus according to claim 2, wherein the drive means comprises a rotatable drive shaft (101); and
   the mechanical motion transmission includes a crank mechanism coupled to said drive shaft, a slide (109) movable by said crank mechanism and having at least two slot guides (111, 121), and means engaged by one of the slot guides to rotate a second gear train;
   a second tape deviating roller (60);
   means pivotably mounting the shaft of said second deviating roller on the support (10), said pivotable mounting means being coupled to said second gear train to pivot the second tape deviating roller into said predetermined path upon movement of the operating handle and hence upon rotation of the drive shaft (101).

8. Apparatus according to claim 7, further comprising at least one lateral tape guide member associated with the second deviating roller (60) and being formed with an aperture through which the shaft of said deviating roller may pass when the deviating roller approaches and is positioned in the operating location to guide the tape for transducing of information.

9. Apparatus according to claim 2, further comprising a gear segment (210) attached to said drive shaft (101) and rotatable thereby;
   a slide (211) having first and second linear gear racks (212) thereon, and in driving connection with said gear segment and linearly moved thereby;
   shafts to receive the tape reels and carrying face gears (34, 37) located on the support, said face gears, and hence said shafts, being in selective rotatable engagement by the respective gear racks upon movement of said handle moving said drive shaft (101).

10. Apparatus according to claim 2, further comprising at least one tape guiding member which guides the tape in the direction of the axis of said deviating roller (24) while extending the tape in said predetermined path.

11. Apparatus according to claim 1, further comprising shafts to receive the tape reels;
   an electric motor for rotation of the tape reels of the shaft during transducing of information to or from the tape; and
   wherein the shaft associated with one of the reels is a hollow shaft coupled to the stator portion of said motor, and the shaft for the other reel is located within said hollow shaft and coupled to the rotor portion of said motor.

* * * * *

UNITED STATES PATENT AND TRADEMARK OFFICE
CERTIFICATE OF CORRECTION

PATENT NO. : 4,259,700

DATED : March 31, 1981

INVENTOR(S) : Dieter Gause et al.

It is certified that error appears in the above—identified patent and that said Letters Patent is hereby corrected as shown below:

Replace all the drawings by the drawings attached hereto.

Signed and Sealed this

Twenty-fourth Day of November 1981

[SEAL]

Attest:

Attesting Officer

GERALD J. MOSSINGHOFF

Commissioner of Patents and Trademarks